(12) United States Patent
Meng et al.

(10) Patent No.: US 9,894,596 B2
(45) Date of Patent: Feb. 13, 2018

(54) METHOD AND DEVICE FOR CONTROLLING ACCESS OF SMART DEVICE

(71) Applicant: Xiaomi Inc., Beijing (CN)

(72) Inventors: Deguo Meng, Beijing (CN); Xin Liu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 70 days.

(21) Appl. No.: 14/975,029

(22) Filed: Dec. 18, 2015

(65) Prior Publication Data

US 2016/0309402 A1 Oct. 20, 2016

(30) Foreign Application Priority Data

Apr. 20, 2015 (CN) .......................... 2015 1 0188490

(51) Int. Cl.
*H04W 48/10* (2009.01)
*H04W 12/08* (2009.01)
(Continued)

(52) U.S. Cl.
CPC .......... *H04W 48/10* (2013.01); *H04W 12/08* (2013.01); *H04W 48/20* (2013.01); *H04W 76/02* (2013.01);
(Continued)

(58) Field of Classification Search
None
See application file for complete search history.

(56) References Cited

U.S. PATENT DOCUMENTS 7,779,328 B2    8/2010 Kim et al.
2005/0054325 A1*  3/2005 Morper .................. G06F 21/43
                                                                455/410
(Continued)

FOREIGN PATENT DOCUMENTS

CN    101227743 A    7/2008
CN    102025715 A    4/2011
(Continued)

OTHER PUBLICATIONS

International Search Report dated Jan. 21, 2016 for International Application No. PCT/CN2015/090651, 4 pages.
(Continued)

*Primary Examiner* — Brandon Renner
*Assistant Examiner* — Jay Vogel

(57) ABSTRACT

The present disclosure relates to a method and a device for controlling access of a smart device, which belongs to the field of wireless communication. The method includes: determining, by a terminal device, whether the smart device is able to support a Low Density Parity Check Code (LDPC) coding-decoding scheme, broadcasting, by the terminal device, information about a Wireless Local Area Network (WLAN) to the smart device through a LDPC coding-decoding scheme if it is determined that the smart device is able to support the LDPC coding-decoding scheme, detecting whether the terminal device would communicate with a router through a LDPC coding-decoding scheme when accessing a WLAN if it is determined that the smart device is not able to support the LDPC coding-decoding scheme, ceasing establishing connection with the router, and broadcasting information about the WLAN through a non-LDPC coding-decoding scheme. The information about the WLAN is used for the smart device to access the WLAN via the
(Continued)

router. The device includes: a detecting module, a controlling module and a broadcasting module.

17 Claims, 6 Drawing Sheets

(51) Int. Cl.
    *H04W 48/20*     (2009.01)
    *H04W 76/02*     (2009.01)
    *H04W 48/12*     (2009.01)
    *H04W 8/22*     (2009.01)
    *H04W 84/12*     (2009.01)

(52) U.S. Cl.
    CPC .............. *H04W 8/22* (2013.01); *H04W 48/12* (2013.01); *H04W 84/12* (2013.01)

(56) References Cited

U.S. PATENT DOCUMENTS

| | | | |
|---|---|---|---|
| 2006/0258338 A1 | 11/2006 | Markki et al. | |
| 2007/0189256 A1* | 8/2007 | Oh | H04W 74/06 370/338 |
| 2007/0281617 A1* | 12/2007 | Meylan | H04W 16/14 455/41.2 |
| 2008/0268882 A1* | 10/2008 | Moloney | H04L 51/18 455/466 |
| 2008/0298474 A1* | 12/2008 | Charbit | H04B 7/15592 375/241 |
| 2010/0054173 A1* | 3/2010 | Kim | H04B 7/155 370/315 |
| 2010/0211846 A1* | 8/2010 | Matsumoto | H03M 13/118 714/752 |
| 2011/0119567 A1* | 5/2011 | Tu | H03M 13/235 714/786 |
| 2013/0201980 A1 | 8/2013 | Rahul et al. | |
| 2014/0241332 A1 | 8/2014 | Yang et al. | |

FOREIGN PATENT DOCUMENTS

| | | |
|---|---|---|
| CN | 104094641 A | 10/2014 |
| CN | 104853401 A | 8/2015 |
| CN | 104853403 A | 8/2015 |
| EP | 3086528 B1 | 5/2017 |
| JP | 2013518508 A | 5/2013 |
| RU | 2392737 C2 | 6/2010 |
| RU | 2453992 C2 | 6/2012 |
| RU | 2546571 C2 | 4/2015 |
| WO | 2008130781 A1 | 10/2008 |
| WO | 2011139962 A1 | 11/2011 |

OTHER PUBLICATIONS

Fritz ! Box: "Installation, Configuration and Operation," URL: https://en.avm.de/fileadmin/user_upload/EN/Manuals/FRITZ_Box/more/Manual_FRITZBox_Fon_WLAN_7340.pdf (retrieved on Jun. 10, 2016), XP055279734, Mar. 31, 2011, pp. 1-84.

International Search Report (including English translation) issued in corresponding International Application No. PCT/CN2015/090651, dated Jan. 21, 2016, 4 pages.

Extended European Search Report issued in corresponding EP Application No. 15199620, dated Jun. 30, 2016, 6 pages.

Office Action (including English translation) issued in corresponding Russian Patent Application No. 2015156886/08(087696), dated Feb. 20, 2017, 15 pages.

Notification of Reasons for Refusal (including English translation) issued in corresponding Japanese Patent Application No. 2017-513306, dated Jun. 29, 2017, 4 pages.

Office Action issued in corresponding MX Application No. 2015017005, dated Dec. 11, 2017, 2 pages.

* cited by examiner

Connecting to WLAN
Selecting an available WLAN for
the device to access the network Xiaomi_houxiaxing
..........

Remember password

Next

METHOD AND DEVICE FOR CONTROLLING ACCESS OF SMART DEVICE

The present application is based upon and claims priority to Chinese Patent Application No. 201510188490.7, filed Apr. 20, 2015, the entire contents of which are incorporated herein by reference.

FIELD

The present disclosure generally relates to the field of wireless communication, and more particularly, to a method and a device for controlling access of a smart device.

BACKGROUND

The statements in this section merely provide background information related to the present disclosure and may not constitute prior art.

Low Density Parity Check Code (briefly referred to as LDPC) is a type of linear block code with sparse parity check matrices. It has an excellent performance approximating to the Shannon limit, and also has a low decoding complexity and a flexible structure. Accordingly, LDPC has become a research focus in the field of channel coding in recent years.

Since it can effectively speed up wireless transmission rate, the LDPC coding has been introduced as a selectable coding scheme under IEEE 802.11n. Some high-performance routers and smart mobile phones support such a coding scheme. When a mobile phone supporting the LDPC coding scheme accesses a router supporting the LDPC coding scheme, they will interact to use the LDPC coding scheme for subsequent data communication during the establishment of connection, so as to enhance the wireless transmission efficiency.

SUMMARY

According to a first aspect of embodiments of the present disclosure, there is provided a method for controlling access of a smart device, which is applied in a terminal, including detecting whether the terminal itself would communicate with a router through a LDPC coding-decoding scheme when access to a WLAN is requested, when determining that the terminal itself could communicate with the router through the LDPC coding-decoding scheme, ceasing establishing connection with the router, and broadcasting information about the WLAN through a non-LDPC coding-decoding scheme. The information about the WLAN is used for the smart device to access the WLAN via the router.

According to a second aspect of embodiments of the present disclosure, there is provided a device for controlling access of a smart device, which is applied in a terminal, including a processor and a memory for storing instructions executable by the processor. The processor is configured to perform determining whether the terminal itself would communicate with a router through a LDPC coding-decoding scheme when accessing a WLAN is requested, when determining that the terminal itself would communicate with the router through the LDPC coding-decoding scheme, ceasing establishing connection with the router, and broadcasting information about the WLAN through a non-LDPC coding-decoding scheme. The information about the WLAN is used for the smart device to access the WLAN via the router.

According to a third aspect of embodiments of the present disclosure, there is provided a non-transitory computer-readable storage medium storing instructions that, when being executed by a processor of a terminal, cause the terminal to perform detecting whether the terminal itself would communicate with a router through a LDPC coding-decoding scheme when accessing a WLAN is requested, when determining that the terminal itself would communicate with the router through the LDPC coding-decoding scheme, ceasing establishing connection with the router, and broadcasting information about the WLAN through a non-LDPC coding-decoding scheme. The information about the WLAN is used for the smart device to access the WLAN via the router.

It is to be understood that both the foregoing general description and the following detailed description are exemplary and explanatory only and are not restrictive of the invention, as claimed.

DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
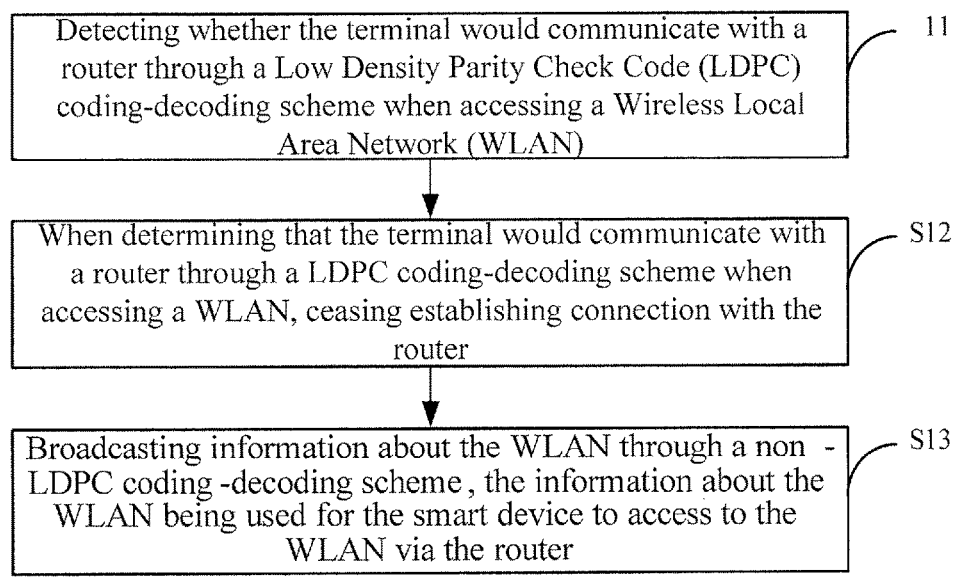
FIG. 1 is a flow chart of a method for controlling access of a smart device according to an exemplary embodiment.

FIG. 1 is a flow chart of a method for controlling access of a smart device according to an exemplary embodiment. As shown in FIG. 1, the method is applied in a terminal, and includes the following steps.

In step S11, it is determined whether the terminal itself would communicate with a router through a Low Density Parity Check Code (LDPC) coding-decoding scheme when accessing a Wireless Local Area Network (WLAN) is requested.

In step S12, when it is determined that the terminal itself would communicate with the router through the LDPC coding-decoding scheme, establishing connection with the router is ceased.

In step S13, information about the WLAN is broadcast through a non-LDPC coding-decoding scheme, the information about the WLAN being used for a smart device to access the WLAN via the router.

In the present embodiment, the terminal includes but not limited to, a mobile phone, a notebook computer, a tablet computer or the like. The terminal, the router and the smart device are within the same wireless local area network WLAN. The router is an accessing device, and the terminal and the smart device can access the WLAN via the router, and then access the Internet. The smart device includes but not limited to, a television, a refrigerator, a microwave oven, a camera or the like.

The information about the WLAN includes but not limited to a WLAN ID and a password. The ID can be a Service Set Identifier (briefly referred to as SSID), such as a name of a LAN "DLINK1", or the like.

After it receives the information about the WLAN, the smart device can request for establishing connection with the router according to the information about the WLAN, and access the Internet via the router after the connection is successfully established.

In the present embodiment, optionally, the method further includes the following step.

Upon receiving a message replied by the smart device when the smart device receives the information about the WLAN, connection with the router is established.

In the present embodiment, optionally, broadcasting information about the WLAN through a non-LDPC coding-decoding scheme includes the following step: a non-LDPC coding-decoding scheme is selected under IEEE 802.11n protocol, and the information about the WLAN is broadcast through the selected coding-decoding scheme.

In the present embodiment, optionally, broadcasting information about the WLAN through a non-LDPC coding-decoding scheme includes the following step: the protocol is switched to IEEE 802.11b/g protocol, a coding-decoding scheme is selected, and the information about the WLAN is broadcast through the selected coding-decoding scheme.

In the present embodiment, optionally, the method further includes the following step. The smart device establishes connection with the router according to the information about the WLAN upon receiving the information about the WLAN.

In the above method provided by the present embodiment, it is detected whether the terminal itself would communicate with a router through a LDPC coding-decoding scheme when accessing a WLAN is requested. When it is determined that the terminal itself would communicate with the router through the LDPC coding-decoding scheme, establishing connection with the router is ceased, and information about the WLAN is broadcast through a non-LDPC coding-decoding scheme. The information about the WLAN is used for the smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 2:
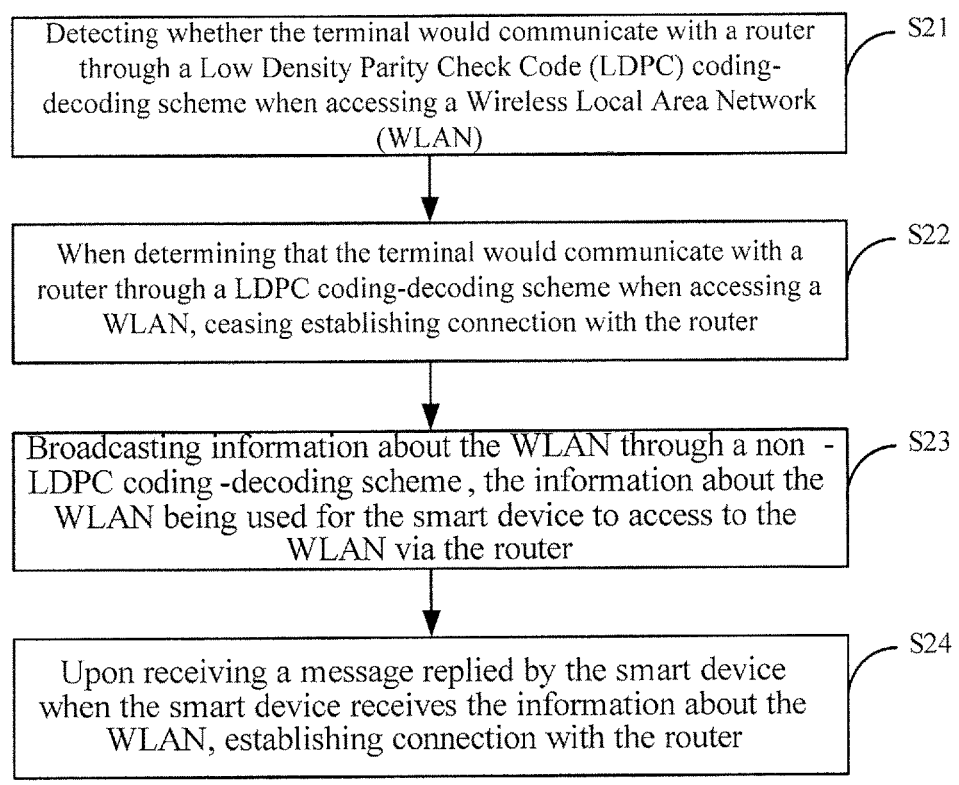
FIG. 2 is a flow chart of a method for controlling access of a smart device according to another exemplary embodiment.

FIG. 2 is a flow chart of a method for controlling access of a smart device according to another exemplary embodiment. As shown in FIG. 2, the method is applied in a terminal, and includes the following steps.

In step S21, it is detected whether the terminal itself would communicate with a router through a Low Density Parity Check Code LDPC coding-decoding scheme when accessing a Wireless Local Area Network WLAN is requested.

In step S22, when it is determined that the terminal itself would communicate with the router through the LDPC coding-decoding scheme, establishing connection with the router is ceased.

Specifically, the terminal ceases establishing connection with the router, in order to prevent the situation in which if the terminal establishes connection with the router through the LDPC coding-decoding scheme, the router will typically communicate with the smart device through the LDPC coding-decoding scheme in default, and the smart device, if not supporting the LDPC coding-decoding scheme, will fail to access the router. In this regard, the terminal ceases establishing connection with the router, and broadcasts information about the WLAN by itself, to ensure that the smart device is capable of receiving the information about the WLAN and properly parsing it.

In step S23, information about the WLAN is broadcast through a non-LDPC coding-decoding scheme. The information about the WLAN is used for the smart device to access the WLAN via the router.

In the present embodiment, optionally, broadcasting information about the WLAN through a non-LDPC coding-decoding scheme includes the following step. A non-LDPC coding-decoding scheme is selected under IEEE 802.11n protocol, and the information about the WLAN is broadcast through the selected coding-decoding scheme.

In the present embodiment, optionally, broadcasting information about the WLAN through a non-LDPC coding-decoding scheme includes the following step. The protocol is switched to IEEE 802.11b/g protocol, a coding-decoding scheme is selected, and the information about the WLAN is broadcast through the selected coding-decoding scheme.

In step S24, upon receiving a message replied by the smart device when the smart device receives the information about the WLAN, the smart device's connection with the router is established.

After it receives the message broadcast by the terminal, the smart device replies a message to the terminal, to notify the terminal that it has properly receives the information about the WLAN. After it learns that the smart device has received the information about the WLAN, the terminal can establish connection with the router. At this time, the coding-decoding scheme for the connection is not limited, and the connection can be established through the LDPC coding-decoding scheme. After the connection is successfully established, the smart device can access the Internet through the router.

Typically, some smart devices have LDPC coding and decoding capabilities, and some have not. In the present embodiment, the smart device refers to a smart device having no LDPC coding and decoding capability. Only when the terminal broadcasts the information about the WLAN through a non-LDPC coding scheme, the smart device can receive the information about the WLAN and parse it, and then establish connection with the router. Otherwise, the smart device cannot access the router, resulting failure in connection.

In the present embodiment, optionally, the method further includes the following step. The smart device establishes connection with the router according to the information about the WLAN upon receiving the information about the WLAN.

In the above method provided by the present embodiment, it is detected whether the terminal itself would communicate with a router through a LDPC coding-decoding scheme when accessing a WLAN is requested. When it is determined that the terminal itself would communicate with the router through the LDPC coding-decoding scheme, the terminal stops establishing connection with the router. Information about the WLAN is broadcast through a non-LDPC coding-decoding scheme. The information about the WLAN is used for the smart device to access the WLAN via the router. And upon receiving a message replied by the smart device when the smart device receives the information about the WLAN, connection with the router is established. It can enable a smart device without a LDPC coding capability to access a WLAN via a router, and prevent a situation where the smart device fails to access the WLAN as a result of it cannot recognize a broadcast message coded in LDPC.

Figure 3:
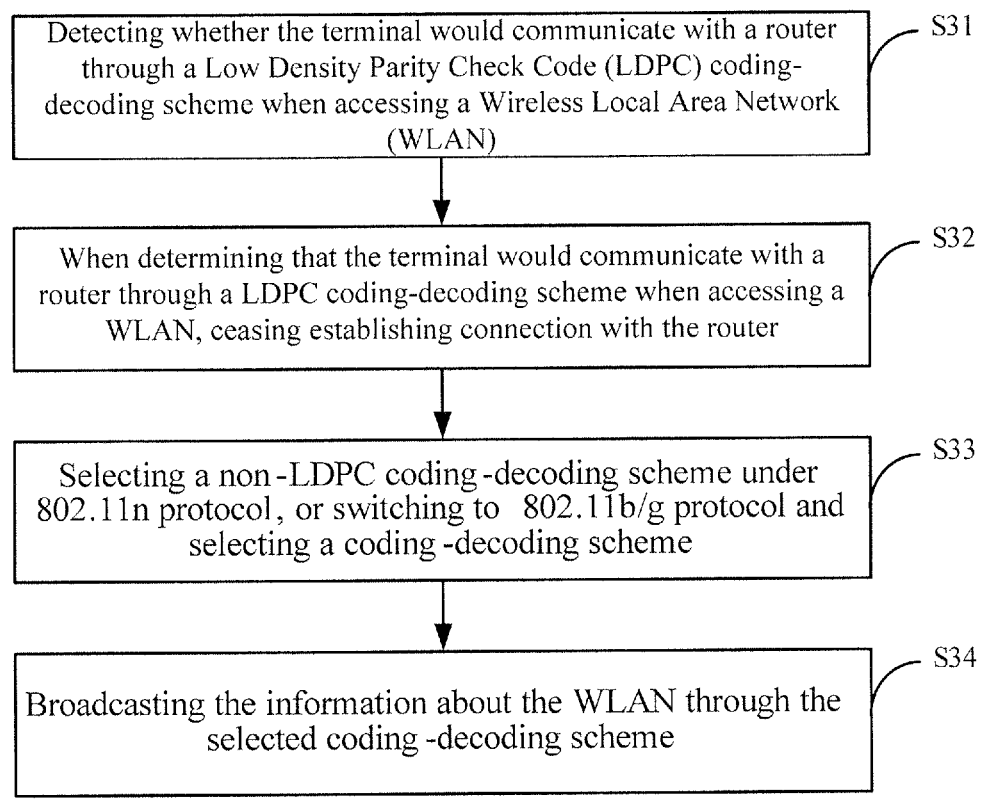
FIG. 3 is a flow chart of a method for controlling access of a smart device according to another exemplary embodiment.

FIG. 3 is a flow chart of a method for controlling access of a smart device according to another exemplary embodiment. As shown in FIG. 3, the method is applied in a terminal, and includes the following steps.

In step S31, it is detected whether the terminal itself would communicate with a router through a LDPC coding-decoding scheme when accessing a WLAN is requested.

Figure 4:
FIG. 4 is a schematic view of a displayed interface of a terminal according to another exemplary embodiment.

Referring to FIG. 4, which is a schematic view of a displayed interface of the terminal, the user can select a WLAN that he wishes to access, enter a password of the WLAN in a box below, then click the "next" button, and a request for accessing the WLAN is triggered.

In step S32, when it is determined that the terminal itself would communicate with the router through the LDPC coding-decoding scheme, establishing connection with the router is ceased.

In step S33, a non-LDPC coding-decoding scheme is selected under IEEE 802.11n protocol, or the protocol is switched to IEEE 802.11b/g protocol and a coding-decoding scheme is selected.

The IEEE 802.11b/g protocol does not include the LDPC coding-decoding scheme. Thus, when they adopt the IEEE 802.11b/g protocol, the terminal and the smart device can adopt any coding-decoding scheme under the protocol since it will be always a non-LDPC coding-decoding scheme.

In step S34, information about the WLAN is broadcast through the selected coding-decoding scheme, the information about the WLAN being used for the smart device to access the WLAN via the router.

In the present embodiment, optionally, the method further includes the following step. Upon receiving a message replied by the smart device when the smart device receives the information about the WLAN, the smart device's connection with the router is established.

In the present embodiment, optionally, the method further includes the following step. The smart device establishes connection with the router according to the information about the WLAN upon receiving the information about the WLAN.

In the above method provided by the present embodiment, it is detected whether the terminal itself would communicate with a router through a LDPC coding-decoding scheme when accessing a WLAN is requested; when it is determined that the terminal itself would communicate with the router through the LDPC coding-decoding scheme, establishing connection with the router is ceased. A non-LDPC coding-decoding scheme is selected under IEEE 802.11n protocol, or the protocol is switched to IEEE 802.11b/g protocol and a coding-decoding scheme is selected. Information about the WLAN is broadcast through the selected coding-decoding scheme, and the information about the WLAN is used for the smart device to access the WLAN via the router. It can enable a smart device without a LDPC coding capability to access a WLAN via a router, and prevent a situation where the smart device fails to access the WLAN as a result of it cannot recognize a broadcast message coded in LDPC.

Figure 5:
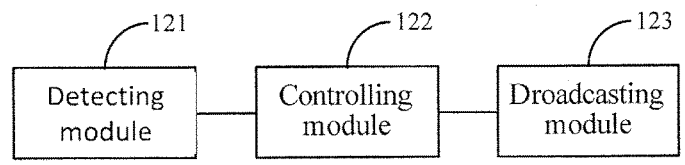
FIG. 5 is a block diagram of a device for controlling access of a smart device according to another exemplary embodiment.

FIG. 5 is a block diagram of a device for controlling access of a smart device according to another exemplary embodiment. Referring to FIG. 5, the device includes a detecting module 121, a controlling module 122 and a broadcasting module 123.

The detecting module 121 is configured to detect whether the terminal itself would communicate with a router through a LDPC coding-decoding scheme when accessing a WLAN is requested.

The controlling module 122 is configured to, when determining that the terminal itself would communicate with the router through the LDPC coding-decoding scheme, cease establishing connection with the router.

The broadcasting module 123 is configured to broadcast information about the WLAN through a non-LDPC coding-decoding scheme. The information about the WLAN is used for the smart device to access the WLAN via the router.

Figure 6:
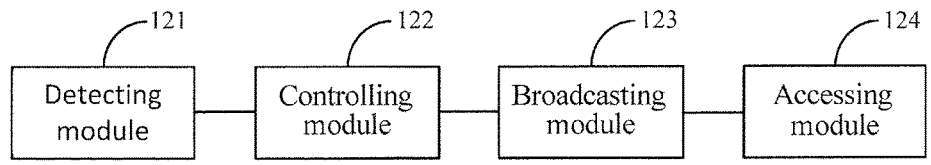
FIG. 6 is a block diagram of a device for controlling access of a smart device according to another exemplary embodiment.

Referring to FIG. 6, in the present embodiment, optionally, the device further includes an accessing module 124 configured to, upon receiving a message replied by the smart device when the smart device receives the information about the WLAN, establish connection with the router.

Figure 7:
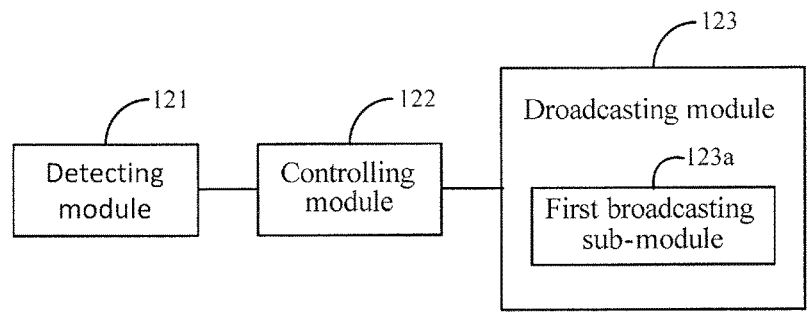
FIG. 7 is a block diagram of a device for controlling access of a smart device according to another exemplary embodiment.

Referring to FIG. 7, in the present embodiment, optionally, the broadcasting module 123 includes A first broadcasting sub-module 123a configured to select a non-LDPC coding-decoding scheme under IEEE 802.11n protocol, and broadcast the information about the WLAN through the selected coding-decoding scheme.

Figure 8:
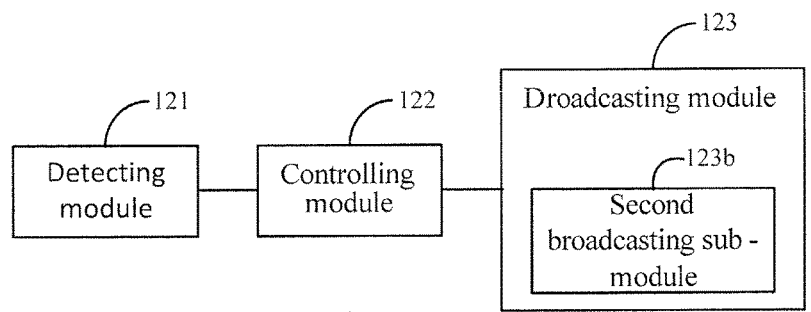
FIG. 8 is a block diagram of a device for controlling access of a smart device according to another exemplary embodiment.

Referring to FIG. 8, in the present embodiment, optionally, the broadcasting module 123 includes a second broadcasting sub-module 123b configured to switch to IEEE 802.11b/g protocol, select a coding-decoding scheme, and broadcast the information about the WLAN through the selected coding-decoding scheme.

In the above device provided by the present embodiment, it is detected whether the terminal itself would communicate with a router through a LDPC coding-decoding scheme when accessing a WLAN is requested. When it is determined that the terminal itself would communicate with the router through the LDPC coding-decoding scheme, establishing connection with the router is ceased, and information about the WLAN is broadcast through a non-LDPC coding-decoding scheme. The information about the WLAN is used for the smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Figure 9:
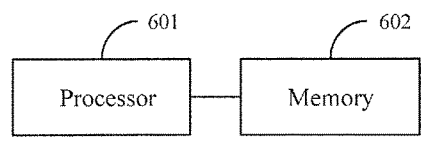
FIG. 9 is a block diagram of a device for controlling access of a smart device according to another exemplary embodiment.

FIG. 9 is a block diagram of a device for controlling access of a smart device according to another exemplary embodiment. Referring to FIG. 9, the device includes a processor 601 and a memory 602 for storing instructions executable by the processor. The processor 601 is configured to perform detecting whether the terminal itself would communicate with a router through a Low Density Parity Check Code LDPC coding-decoding scheme when accessing a Wireless Local Area Network WLAN is requested, when determining that the terminal itself would communicate with the router through the LDPC coding-decoding scheme, ceasing establishing connection with the router, and broadcasting information about the WLAN through a non-LDPC coding-decoding scheme, the information about the WLAN being used for the smart device to access the WLAN via the router.

Figure 10:
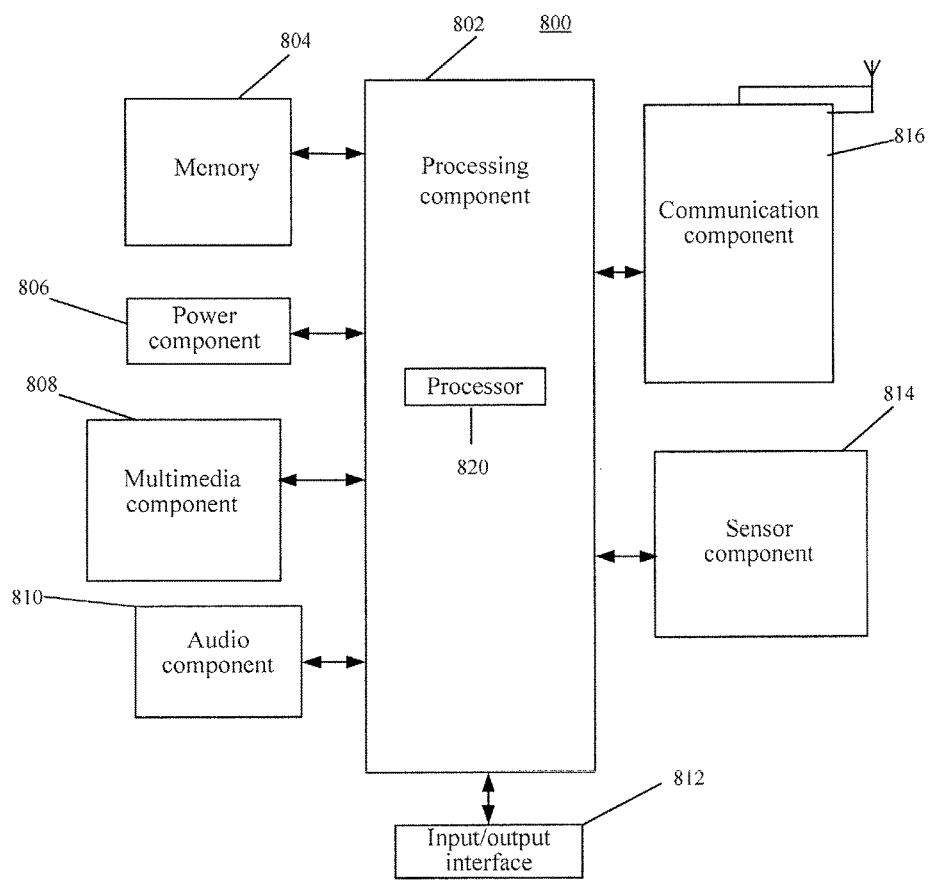
FIG. 10 is a block diagram of a device for controlling access of a smart device according to another exemplary embodiment.

FIG. 10 is a block diagram of a device 800 for controlling access of a smart device according to another exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 10, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method provided by any one of the above embodiments.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a mobile terminal, the mobile terminal is caused to perform any of the above methods.

In the above non-transitory computer readable storage medium provided by the present embodiment, it is detected whether the terminal itself would communicate with a router through a Low Density Parity Check Code LDPC coding-decoding scheme when accessing a Wireless Local Area Network WLAN is requested; when it is determined that the terminal itself would communicate with the router through the LDPC coding-decoding scheme, establishing connection with the router is ceased; and information about the WLAN is broadcast through a non-LDPC coding-decoding scheme, the information about the WLAN being used for the smart device to access the WLAN via the router. It can enable a smart device without a LDPC coding capability to access a WLAN via a router, and prevent a situation in which the smart device fails to access the WLAN as a result of it cannot recognize a broadcast message coded in LDPC.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling access of a smart device to the Internet, comprising:
   communicating, by a terminal device, with the smart device to determine whether the smart device is able to support a Low Density Parity Check Code (LDPC) coding-decoding scheme;
   broadcasting, by the terminal device, information about a Wireless Local Area Network (WLAN) to the smart device through a LDPC coding-decoding scheme if it is determined that the smart device is able to support the LDPC coding-decoding scheme;
   ceasing, by the terminal device, the establishment of the connection with the router when detecting, by the terminal device, that the terminal device establishes a connection with a router for communicating through a Low Density Parity Check Code (LDPC) coding-decoding scheme when accessing a Wireless Local Area Network (WLAN) and it is determined that the smart device is not able to support the LDPC coding-decoding scheme; and
   broadcasting, by the terminal device, the information about the WLAN through a non-LDPC coding-decoding scheme, the information about the WLAN being used for the smart device to access the WLAN via the router.

2. The method according to claim 1, wherein the method further comprises: upon receiving a message replied by the smart device, the message being responsive to the smart device receiving the information about the WLAN, establishing connection between the terminal device and the router.

3. The method according to claim 1, wherein broadcasting information about the WLAN through a non-LDPC coding-decoding scheme comprises:
   selecting a non-LDPC coding-decoding scheme under IEEE 802.11n protocol, and broadcasting the information about the WLAN through the selected coding-decoding scheme.

4. The method according to claim 1, wherein broadcasting information about the WLAN through a non-LDPC coding-decoding scheme comprises:
   switching to IEEE 802.11b/g protocol, selecting a coding-decoding scheme, and broadcasting the information about the WLAN through the selected coding-decoding scheme.

5. The method according to claim 1, wherein the method further comprises:
   the smart device establishing connection with the router based on the broadcasted information.

6. The method according to claim 1, wherein the smart device comprises one of a television, a refrigerator, a microwave oven, or a camera.

7. The method according to claim 1, wherein the information about the WLAN comprises identification of the WLAN and a password.

8. A device for controlling access of a smart device, comprising:
   a processor; and
   a memory for storing instructions executable by the processor,
   wherein the processor is configured to perform:
   communicating, by a terminal device, with the smart device to determine whether the smart device is able to support a Low Density Parity Check Code (LDPC) coding-decoding scheme;
   broadcasting, by the terminal device, information about a Wireless Local Area Network (WLAN) to the smart device through a LDPC coding-decoding scheme if it is determined that the smart device is able to support the LDPC coding-decoding scheme;
   ceasing, by the terminal device, the establishment of the connection with the router when detecting, by the terminal device, that a terminal device establishes a connection with a router to communicate through a LDPC coding-decoding scheme when accessing a WLAN and it is determined that the smart device is not able to support the LDPC coding-encoding scheme; and
   broadcasting, by the terminal device, the information about the WLAN through a non-LDPC coding-decoding scheme, the information about the WLAN being used for the smart device to access the WLAN via the router.

9. The device according to claim 8, wherein the processor is further configured to perform:
   upon receiving a message replied by the smart device, the message being responsive to the smart device receiving the information about the WLAN, establishing connection between the terminal and the router.

10. The device according to claim 8, wherein broadcasting information about the WLAN through a non-LDPC coding-decoding scheme comprises:

selecting a non-LDPC coding-decoding scheme under IEEE 802.11n protocol, and broadcasting the information about the WLAN through the selected coding-decoding scheme.

11. The device according to claim 8, wherein broadcasting information about the WLAN through a non-LDPC coding-decoding scheme comprises:
switching to IEEE 802.11b/g protocol, selecting a coding-decoding scheme, and broadcasting the information about the WLAN through the selected coding-decoding scheme.

12. The device according to claim 8, wherein the processor is further configured to perform:
establishing connection with the router through the LDPC coding-decoding scheme after the smart device establishes connection with the router based on the broadcasted information about the WLAN.

13. A non-transitory computer-readable storage medium storing instructions that, when being executed by a processor of a terminal device, cause the terminal device to perform:
communicating with a smart device to determine whether the smart device is able to support a Low Density Parity Check Code (LDPC) coding-decoding scheme;
broadcasting information about a Wireless Local Area Network (WLAN) to the smart device through a LDPC coding-decoding scheme if it is determined that the smart device is able to support the LDPC coding-decoding scheme;
ceasing establishing the connection with the router when detecting that the terminal establishes connection with a router for communicating through a LDPC coding-decoding scheme when accessing a WLAN and it is determined that the smart device is not able to support the LDPC coding-decoding scheme; and
broadcasting the information about the WLAN through a non-LDPC coding-decoding scheme, the information about the WLAN being used for the smart device to access the WLAN via the router.

14. The non-transitory computer-readable storage medium according to claim 13, wherein the terminal is further caused to perform:
upon receiving a message replied by the smart device, the message being responsive to the smart device receiving the information about the WLAN, establishing connection with the router.

15. The non-transitory computer-readable storage medium according to claim 13, wherein broadcasting the information about the WLAN through a non-LDPC coding-decoding scheme comprises:
selecting a non-LDPC coding-decoding scheme under IEEE 802.11n protocol, and broadcasting the information about the WLAN through the selected coding-decoding scheme.

16. The non-transitory computer-readable storage medium according to claim 13, wherein broadcasting the information about the WLAN through a non-LDPC coding-decoding scheme comprises:
switching to IEEE 802.11b/g protocol, selecting a coding-decoding scheme, and broadcasting the information about the WLAN through the selected coding-decoding scheme.

17. The non-transitory computer-readable storage medium according to claim 13, wherein the terminal is further caused to perform:
establishing connection with the router through the LDPC coding-decoding scheme after the smart device establishes connection with the router based on the broadcasted information about the WLAN.

* * * * *